United States Patent
Yokotani et al.

(10) Patent No.: US 11,352,469 B2
(45) Date of Patent: Jun. 7, 2022

(54) FLUORORESIN FILM

(71) Applicant: DAIKIN INDUSTRIES, LTD., Osaka (JP)

(72) Inventors: Kouji Yokotani, Osaka (JP); Nobuyuki Komatsu, Osaka (JP); Takeshi Hazama, Osaka (JP); Mayuko Tatemichi, Osaka (JP); Akio Higaki, Osaka (JP); Tatsuya Higuchi, Osaka (JP); Keiko Yamazaki, Osaka (JP)

(73) Assignee: DAIKIN INDUSTRIES. LTD., Osaka (JP)

( * ) Notice: Subject to any disclaimer, the term of this patent is extended or adjusted under 35 U.S.C. 154(b) by 0 days.

(21) Appl. No.: 16/480,132

(22) PCT Filed: Jan. 17, 2018

(86) PCT No.: PCT/JP2018/001180
§ 371 (c)(1),
(2) Date: Jul. 23, 2019

(87) PCT Pub. No.: WO2018/142933
PCT Pub. Date: Aug. 9, 2018

(65) Prior Publication Data
US 2019/0382544 A1 Dec. 19, 2019

(30) Foreign Application Priority Data
Jan. 31, 2017 (JP) .............................. JP2017-016033

(51) Int. Cl.
*C08J 5/18* (2006.01)
*C08L 27/18* (2006.01)
*H01G 4/18* (2006.01)

(52) U.S. Cl.
CPC ................. *C08J 5/18* (2013.01); *C08L 27/18* (2013.01); *H01G 4/18* (2013.01); *C08J 2327/18* (2013.01); *C08J 2427/18* (2013.01); *Y10T 428/24355* (2015.01)

(58) Field of Classification Search
CPC ...... C08J 5/18; C08J 2327/18; C08J 2427/16; C08L 27/18; C08L 2205/02; C08L 2205/025; H01G 4/18; Y10T 428/24355
See application file for complete search history.

(56) References Cited

U.S. PATENT DOCUMENTS

| | | | |
|---|---|---|---|
| 2009/0136714 A1* | 5/2009 | Itou ........................... | C08J 5/18 428/152 |
| 2010/0110609 A1 | 5/2010 | Koh et al. | |
| 2011/0195227 A1 | 8/2011 | Shimoi et al. | |
| 2011/0228442 A1* | 9/2011 | Zhang ...................... | H01G 4/18 361/311 |
| 2012/0293909 A1 | 11/2012 | Tatemichi et al. | |
| 2013/0188293 A1* | 7/2013 | Koh ..................... | C08F 214/26 361/323 |
| 2015/0005456 A1* | 1/2015 | Marrani ............. | C08F 214/222 525/376 |
| 2016/0264742 A1* | 9/2016 | Kou ....................... | H01G 4/306 |
| 2017/0260383 A1* | 9/2017 | Fukui ........................ | C08J 5/18 |
| 2019/0338091 A1* | 11/2019 | Sato ...................... | H01G 4/206 |

FOREIGN PATENT DOCUMENTS

| | | |
|---|---|---|
| JP | 4940986 B2 | 5/2012 |
| KR | 10-2012-0123432 A | 11/2012 |
| WO | 2008/090947 A1 | 7/2008 |
| WO | 2012/039424 A1 | 3/2012 |

OTHER PUBLICATIONS

International Preliminary Report on Patentability with the translation of Written Opinion dated Aug. 6, 2019 issued by the International Bureau in International Application No. PCT/JP2018/001180.
International Search Report of PCT/JP2018/001180 dated Apr. 24, 2018 [PCT/ISA/210].
Extended European Search Report for European Application. No. 18748116.3 dated Jul. 10, 2020.

* cited by examiner

*Primary Examiner* — Nancy R Johnson
(74) *Attorney, Agent, or Firm* — Sughrue Mion, PLLC

(57) ABSTRACT

A fluororesin film containing a fluororesin. The fluororesin film has on at least one surface thereof a ten-point average roughness of 0.100 to 1.200 μm and an arithmetic average roughness of 0.010 to 0.050 μm. Further, the fluororesin film has a breakdown strength of 400 V/μm or higher.

10 Claims, No Drawings

FLUORORESIN FILM

CROSS REFERENCE TO RELATED APPLICATIONS

This application is a National Stage of International Application No. PCT/JP2018/001180, filed Jan. 17, 2018, claiming priority to Japanese Patent Application No. 2017-016033, filed Jan. 31, 2017.

TECHNICAL FIELD

The invention relates to fluororesin films.

BACKGROUND ART

Films of a vinylidene fluoride homopolymer and films of a copolymer of vinylidene fluoride and another monomer are known to have a high relative permittivity.

Patent Literature 1 discloses a highly dielectric film formed from a fluororesin containing a total of 95 mol % or more of a vinylidene fluoride unit and a tetrafluoroethylene unit.

Patent Literature 2 discloses a film for film capacitors, wherein the film contains, as a film-forming resin, tetrafluoroethylene resin containing a vinylidene fluoride unit and a tetrafluoroethylene unit at a mol % ratio in the range from 0/100 to 49/51 (vinylidene fluoride unit/tetrafluoroethylene unit).

Patent Literature 3 discloses a biaxially oriented polypropylene film containing a polypropylene resin mainly composed of propylene, wherein the polypropylene resin is a mixture of a linear polypropylene and 0.1 to 1.5% by weight of a branched polypropylene (H) that satisfies a relationship of log(MS)>−0.56 log(MFR)+0.74, where MS and MFR respectively represent the melt strength and the melt flow rate measured at 230° C., at least one surface of the film includes a satin-finished uneven base layer, and the surface has a ten-point average roughness (Rz) of 0.50 to 1.50 μm and a surface gloss of 90 to 135%.

CITATION LIST

Patent Literatures

Patent Literature 1: WO 2008/090947
Patent Literature 2: WO 2012/039424
Patent Literature 3: JP 4940986 B

SUMMARY OF INVENTION

Technical Problem

Fluororesin films used for film capacitors, for example, need to have not only a high relative permittivity but also a low coefficient of static friction so as to achieve improved easiness of taking up the films while having a high breakdown strength. Unfortunately, no fluororesin films have been developed that have a low coefficient of static friction while maintaining a high breakdown strength.

In view of the above current state of the art, the invention aims to provide a fluororesin film having a low coefficient of static friction and a high breakdown strength.

Solution to Problem

The invention relates to a fluororesin film containing a fluororesin, the fluororesin film having on at least one surface thereof a ten-point average roughness of 0.100 to 1.200 μm and an arithmetic average roughness of 0.010 to 0.050 μm, and the fluororesin film having a breakdown strength of 400 V/μm or higher.

The fluororesin is preferably a vinylidene fluoride/tetrafluoroethylene copolymer. The fluororesin preferably further contains a copolymerized unit based on an ethylenically unsaturated monomer other than tetrafluoroethylene and vinylidene fluoride.

The fluororesin film of the invention preferably further contains an inorganic particulate. The inorganic particulate is preferably present in an amount of 0.01 to 5 parts by mass relative to 100 parts by mass of the fluororesin.

The fluororesin film of the invention is preferably embossed.

The fluororesin film of the invention is also preferably surface-coated.

The fluororesin in the fluororesin film of the invention preferably contains two fluororesin species.

The fluororesin in the fluororesin film of the invention preferably contains a non-crosslinked fluororesin and a crosslinked fluororesin.

The fluororesin in the fluororesin film of the invention preferably contains two fluororesin species having different melt flow rates. Preferably, a first fluororesin species has a melt flow rate of 2.0 to 30.0 g/10 min and a second fluororesin species has a melt flow rate of 0.1 to 1.9 g/10 min.

The fluororesin in the fluororesin film of the invention preferably contains two fluororesin species having different composition ratios of polymerized units. Preferably, a first fluororesin species is a vinylidene fluoride/tetrafluoroethylene copolymer having a mole ratio of a vinylidene fluoride unit to a tetrafluoroethylene unit of 95.0/5.0 to 39.0/61.0 and a second fluororesin species is a vinylidene fluoride/tetrafluoroethylene copolymer having a mole ratio of a vinylidene fluoride unit to a tetrafluoroethylene unit of 38.9/61.1 to 5.0/95.0.

The fluororesin film of the invention is preferably a biaxially stretched film.

The fluororesin film of the invention preferably has a thickness of 1 to 100 μm.

The invention also relates to a film for a film capacitor, the film including the above fluororesin film and an electrode layer on at least one surface of the fluororesin film.

The invention also relates to a film capacitor including the above film for a film capacitor.

Advantageous Effects of Invention

The fluororesin film of the invention, which has any of the above structures, has a low coefficient of static friction and a high breakdown strength.

DESCRIPTION OF EMBODIMENTS

The invention is described in detail below.

The fluororesin film of the invention contains a fluororesin. The fluororesin film has, on at least one surface thereof, a ten-point average roughness of 0.100 to 1.200 μm and an arithmetic average roughness of 0.010 to 0.050 μm, and the fluororesin film has a breakdown strength of 400 V/μm or higher. Thus, the fluororesin film has a low coefficient of static friction even though it has a high breakdown strength. This leads to excellent take-up easiness.

When a fluororesin film is used as a highly dielectric film for a film capacitor and suffers electrical breakdown, it generates gas and the reliability of the fluororesin film is reduced. On the contrary, the fluororesin film of the invention having the above structure allows easy release of the gas generated and can have excellent reliability (e.g., long-term durability).

Further, the presence of the fluororesin leads to a high electric capacity even when the film has a reduced thickness in comparison with the case of using a resin having a low permittivity.

Common vinylidene-based fluororesins are highly dielectric materials and are resins which are likely to be charged with static electricity (likely to be electrified) in comparison with general-purpose resins. Due to the static electricity, films of such resins are likely to stick to each other or to rolls during film molding. Thus, such films are difficult to handle and cause low productivity. As the film surface becomes smoother (the contact area becomes larger), a greater van der Waals force (intermolecular force) acts on the films. Thus, the films are likely to stick to each other or to rolls, resulting in poorer handleability.

The fluorine film of the invention has a specific breakdown strength and specific surface features. Thus, even a highly dielectric material can lead to a highly dielectric film that is smooth without sticking of the film to itself or to rolls of a molding machine in film production, and thus causes no reduction in film handleability and film productivity.

The fluororesin film of the invention has on at least one surface thereof a ten-point average roughness of 0.100 to 1.200 μm and an arithmetic average roughness of 0.010 to 0.050 μm.

In order to achieve a low coefficient of static friction and excellent reliability of the fluororesin film, the ten-point average roughness is preferably 0.150 to 1.150 μm, more preferably 0.170 to 1.100 μm, still more preferably 0.200 to 1.000 μm. The arithmetic average roughness is preferably 0.011 to 0.048 μm, more preferably 0.012 to 0.045 μm, still more preferably 0.013 to 0.045 μm.

The values of the ten-point average roughness and the arithmetic average roughness are determined in conformity with JIS B 0601-2001. For example, the measurements may be performed using a "laser microscope" available from Keyence Corp.

The fluororesin film of the invention has a breakdown strength of 400 V/μm or higher, preferably 420 V/μm or higher, more preferably 450 V/μm or higher, particularly preferably 500 V/μm or higher. The upper limit of the breakdown strength may be, but is not limited to, 1000 V/μm or lower, or may be 800 V/μm or lower, for example. The breakdown strength may be 700 V/μm or lower, or may be 650 V/μm or lower.

The breakdown strength is determined as follows. The film is placed on a lower electrode and a 500-g weight having a diameter of 25 mm is placed thereon as an upper electrode. A voltage applied between the ends is increased at a rate of 100 V/sec, and the voltage at break is measured. The number of measurement operations is 50. The measured values of the respective operations, excluding the five highest values and the five lowest values, are averaged. This average is divided by the thickness, whereby the breakdown strength is obtained.

The fluororesin film of the invention preferably has a crystallinity of 50% or higher. The fluororesin film produced with a crystallinity within the above range can have the aforementioned breakdown strength. The crystallinity is more preferably 60% or higher, still more preferably 70% or higher. The upper limit of the crystallinity may be, but is not limited to, 100%. A resin having a high crystallinity is effective in achieving a breakdown strength of 400 V/μm or higher.

The crystallinity of the film is determined by peak separation using an X-ray diffractometer. Specifically, films are stacked to provide a measurement sample having a total thickness of 40 μm or greater. This measurement sample is mounted on a sample holder and analyzed using the X-ray diffractometer, so that a diffraction spectrum is obtained. The crystallinity is then calculated from the area ratio of the crystal portions and the amorphous portions in the diffraction spectrum.

The invention relates to a fluororesin film containing a fluororesin.

Examples of the fluororesin include polytetrafluoroethylene, tetrafluoroethylene/ethylene copolymers, polyvinylidene fluoride, tetrafluoroethylene/perfluoroalkyl vinyl ether copolymers, and tetrafluoroethylene/hexafluoropropylene copolymers. The fluororesin is more preferably a melt-fabricable fluororesin.

In order to exhibit much better heat resistance and higher dielectricity, preferred are fluoropolymers containing a vinylidene fluoride unit. More preferred is at least one selected from the group consisting of vinylidene fluoride/tetrafluoroethylene copolymers, vinylidene fluoride/trifluoroethylene copolymers, vinylidene fluoride/hexafluoropropylene copolymers, and vinylidene fluoride/tetrafluoroethylene/hexafluoropropylene copolymers.

The fluororesin preferably has a melt flow rate (MFR) of 0.1 to 100 g/10 min, more preferably 0.1 to 50 g/10 min.

The MFR is the mass (g/10 min) of a polymer that flows out of a nozzle having an inner diameter of 2 mm and a length of 8 mm per 10 minutes at 297° C. under a load of 5 kg in conformity with ASTM D3307-01.

The fluororesin preferably has a relative permittivity ($\varepsilon$) of 8 or higher, more preferably 9 or higher, at a frequency of 1 kHz and 30° C. The upper limit of the relative permittivity may be, but is not limited to, 15.

The relative permittivity is a value calculated by the following formula: $C=\varepsilon \times \varepsilon_0 \times S/d$, wherein C is the capacitance of a sample measured using an LCR meter, the sample being prepared by depositing aluminum with a diameter of 50 mm on a surface of the film prepared by molding the fluororesin and depositing aluminum on the whole opposite surface; S is the electrode area; d is the film thickness; and $\varepsilon_0$ is the permittivity of vacuum.

The fluororesin preferably has a melting point of 180° C. or higher. The upper limit thereof may be 320° C. A more preferred lower limit is 190° C., and a more preferred upper limit is 300° C.

The melting point is defined as the temperature corresponding to the peak on an endothermic curve obtained by thermal analysis at a temperature-increasing rate of 10° C./min using a differential scanning calorimeter in conformity with ASTM D-4591.

The fluororesin preferably has a pyrolysis starting temperature (1% mass reduction temperature) of 360° C. or higher. A more preferred lower limit thereof is 370° C. The upper limit of the pyrolysis starting temperature may be 410° C., for example, as long as it falls within the above range.

The pyrolysis starting temperature is the temperature at which 1% by mass of a copolymer subjected to a heating test is decomposed, and is a value obtainable by measuring the temperature at which the mass of the copolymer subjected to the heating test is reduced by 1% by mass, using a thermogravimetric/differential thermal analyzer (TG-DTA).

The fluororesin preferably has a storage elastic modulus (E') at 170° C. of 60 to 400 MPa measured by dynamic viscoelasticity analysis.

The storage elastic modulus is a value measured at 170° C. by dynamic viscoelasticity analysis. More specifically, the storage elastic modulus is a value measured on a sample having a length of 30 mm, width of 5 mm, and thickness of 0.25 mm, using a dynamic viscoelasticity analyzer in a tensile mode with a clamp width of 20 mm and at a measurement temperature of 25° C. to 250° C., a temperature-increasing rate of 2° C./min, and a frequency of 1 Hz. The storage elastic modulus (E') at 170° C. is more preferably 80 to 350 MPa, still more preferably 100 to 350 MPa.

Test samples may be prepared by, for example, setting the molding temperature to a temperature higher than the melting point of the copolymer by 50° C. to 100° C., preparing a film having a thickness of 0.25 mm under a pressure of 3 MPa, and cutting the film into pieces of 30 mm length and 5 mm width.

In order to achieve excellently high dielectricity, a low coefficient of static friction, and a high breakdown strength, the fluororesin is preferably a vinylidene fluoride/tetrafluoroethylene copolymer (VdF/TFE copolymer).

The VdF/TFE copolymer preferably has a mole ratio of a vinylidene fluoride unit to a tetrafluoroethylene unit of 5/95 to 95/5, more preferably 10/90 to 90/10, still more preferably 10/90 to 49/51. The ratio is more preferably 20/80 or higher (the VdF unit represents 20 mol % or more and the TFE unit represents 80 mol % or less relative to 100 mol % in total of the VdF unit and the TFE unit), still more preferably 45/55 or lower (the VdF unit represents 45 mol % or less and the TFE unit represents 55 mol % or more relative to 100 mol % in total of the VdF unit and the TFE unit).

The VdF/TFE copolymer preferably further contains a copolymerized unit of an ethylenically unsaturated monomer other than tetrafluoroethylene and vinylidene fluoride.

The copolymerized unit of an ethylenically unsaturated monomer may be present in an amount of 0 to 50 mol %, 0 to 40 mol %, 0 to 30 mol %, 0 to 15 mol %, 0 to 10 mol %, or 0 to 5 mol %, of all the copolymerized units. The amount of the copolymer of an ethylenically unsaturated monomer may be 0.1 mol % or more.

The ethylenically unsaturated monomer may be any monomer copolymerizable with tetrafluoroethylene and vinylidene fluoride, and is preferably at least one selected from the group consisting of ethylenically unsaturated monomers represented by any of the following formulae (1) and (2).

The formula (1) is as follows:

$$CX^1X^2=CX^3(CF_2)_nX^4 \qquad (1)$$

(wherein $X^1$, $X^2$, $X^3$, and $X^4$ are the same as or different from each other, and are each H, F, or Cl; and n is an integer of 0 to 8), other than tetrafluoroethylene and vinylidene fluoride.

The formula (2) is as follows:

$$CF_2=CF-ORf^1 \qquad (2)$$

wherein $Rf^1$ is a C1-C3 alkyl group or a C1-C3 fluoroalkyl group.

Preferred among the ethylenically unsaturated monomers represented by the formula (1) is at least one selected from the group consisting of $CF_2=CFCl$, $CF_2=CFCF_3$, those represented by the following formula (3):

$$CH_2=CF-(CF_2)_nX^4 \qquad (3)$$

(wherein $X^4$ and n are as defined above), and those represented by the following formula (4):

$$CH_2=CH-(CF_2)_nX^4 \qquad (4)$$

(wherein $X^4$ and n are as defined above). More preferred is at least one selected from the group consisting of $CF_2=CFCl$, $CH_2=CFCF_3$, $CH_2=CH-C_4F_9$, $CH_2=CH-C_6F_{13}$, $CH_2=CF-C_3F_6H$, and $CF_2=CFCF_3$. Still more preferred is at least one selected from the group consisting of $CF_2=CFCl$, $CH_2=CH-C_6F_{13}$, and $CH_2=CFCF_3$.

Preferred among the ethylenically unsaturated monomers represented by the formula (2) is at least one selected from the group consisting of $CF_2=CF-OCF_3$, $CF_2=CF-OCF_2CF_3$, and $CF_2=CF-OCF_2CF_2CF_3$.

The VdF/TFE copolymer is preferably a copolymer containing 55.0 to 90.0 mol % of a copolymerized unit of tetrafluoroethylene, 5.0 to 44.9 mol % of a copolymerized unit of vinylidene fluoride, and 0.1 to 10.0 mol % of a copolymerized unit of an ethylenically unsaturated monomer represented by the formula (1):

$$CX^1X^2=CX^3(CF_2)_nX^4 \qquad (1)$$

(wherein $X^1$, $X^2$, $X^3$, and $X^4$ are the same or different from each other, and are each H, F, or Cl; and n is an integer of 0 to 8), other than tetrafluoroethylene and vinylidene fluoride.

The VdF/TFE copolymer is more preferably a copolymer containing 55.0 to 85.0 mol % of a copolymerized unit of tetrafluoroethylene, 10.0 to 44.9 mol % of a copolymerized unit of vinylidene fluoride, and 0.1 to 5.0 mol % of a copolymerized unit of an ethylenically unsaturated monomer represented by the formula (1).

The VdF/TFE copolymer is still more preferably a copolymer containing 55.0 to 85.0 mol % of a copolymerized unit of tetrafluoroethylene, 13.0 to 44.9 mol % of a copolymerized unit of vinylidene fluoride, and 0.1 to 2.0 mol % of a copolymerized unit of an ethylenically unsaturated monomer represented by the formula (1).

In order to improve the mechanical strength of the VdF/TFE copolymer at high temperatures and low temperatures, the ethylenically unsaturated monomer represented by the formula (1) is preferably at least one monomer selected from the group consisting of $CH_2=CH-C_4F_9$, $CH_2=CH-C_6F_{13}$, and $CH_2=CF-C_3F_6H$. More preferably, the ethylenically unsaturated monomer represented by the formula (1) is at least one monomer selected from the group consisting of $CH_2=CH-C_4F_9$, $CH_2=CH-C_6F_{13}$, and $CH_2=CF-C_3F_6H$, and the copolymer is a copolymer containing 55.0 to 80.0 mol % of a copolymerized unit of tetrafluoroethylene, 19.5 to 44.9 mol % of a copolymerized unit of vinylidene fluoride, and 0.1 to 0.6 mol % of a copolymerized unit of an ethylenically unsaturated monomer represented by the formula (1).

The VdF/TFE copolymer may be a copolymer containing 58.0 to 85.0 mol % of a copolymerized unit of tetrafluoroethylene, 10.0 to 41.9 mol % of a copolymerized unit of vinylidene fluoride, and 0.1 to 5.0 mol % of a copolymerized unit of an ethylenically unsaturated monomer represented by the formula (1).

The VdF/TFE copolymer is also preferably a copolymer containing 55.0 to 90.0 mol % of a copolymerized unit of tetrafluoroethylene, 9.2 to 44.2 mol % of a copolymerized unit of vinylidene fluoride, and 0.1 to 0.8 mol % of a copolymerized unit of an ethylenically unsaturated monomer represented by the formula (2):

$$CF_2=CF-ORf^1 \qquad (2)$$

wherein $Rf^1$ is a C1-C3 alkyl group or a C1-C3 fluoroalkyl group.

The VdF/TFE copolymer is more preferably a copolymer containing 58.0 to 85.0 mol % of a copolymerized unit of tetrafluoroethylene, 14.5 to 39.9 mol % of a copolymerized unit of vinylidene fluoride, and 0.1 to 0.5 mol % of a copolymerized unit of an ethylenically unsaturated monomer represented by the formula (2).

The VdF/TFE copolymer is also preferably a copolymer containing 55.0 to 90.0 mol % of a copolymerized unit of tetrafluoroethylene, 5.0 to 44.8 mol % of a copolymerized unit of vinylidene fluoride, 0.1 to 10.0 mol % of a copolymerized unit of an ethylenically unsaturated monomer represented by the formula (1), and 0.1 to 0.8 mol % of a copolymerized unit of an ethylenically unsaturated monomer represented by the formula (2).

The VdF/TFE copolymer is more preferably a copolymer containing 55.0 to 85.0 mol % of a copolymerized unit of tetrafluoroethylene, 9.5 to 44.8 mol % of a copolymerized unit of vinylidene fluoride, 0.1 to 5.0 mol % of a copolymerized unit of an ethylenically unsaturated monomer represented by the formula (1), and 0.1 to 0.5 mol % of a copolymerized unit of an ethylenically unsaturated monomer represented by the formula (2).

The VdF/TFE copolymer is still more preferably a copolymer containing 55.0 to 80.0 mol % of a copolymerized unit of tetrafluoroethylene, 19.8 to 44.8 mol % of a copolymerized unit of vinylidene fluoride, 0.1 to 2.0 mol % of a copolymerized unit of an ethylenically unsaturated monomer represented by the formula (1), and 0.1 to 0.3 mol % of a copolymerized unit of an ethylenically unsaturated monomer represented by the formula (2).

The copolymer having such a composition has particularly excellently low permeability.

The copolymer may also be a copolymer containing 58.0 to 85.0 mol % of a copolymerized unit of tetrafluoroethylene, 9.5 to 39.8 mol % of a copolymerized unit of vinylidene fluoride, 0.1 to 5.0 mol % of a copolymerized unit of an ethylenically unsaturated monomer represented by the formula (1), and 0.1 to 0.5 mol % of a copolymerized unit of an ethylenically unsaturated monomer represented by the formula (2).

The fluororesin film of the invention may be a film consisting essentially of a fluororesin, or may be a film containing a different component in addition to the fluororesin. The fluororesin film of the invention preferably contains 50% by mass or more of the fluororesin.

More preferred embodiments of the invention are described hereinbelow.

The fluororesin film of the invention may further contain an inorganic particulate. The presence of the inorganic particulate contained in the fluororesin film enables production of a fluororesin film having the above ten-point average roughness and arithmetic average roughness, improving the take-up easiness. The presence of the inorganic particulate can also improve the property of mechanical strength.

In order to provide a fluororesin film having the above ten-point average roughness and arithmetic average roughness, the inorganic particulate is preferably present in an amount of 0.01 to 5 parts by mass relative to 100 parts by mass of the fluororesin. The amount thereof is more preferably 0.05 to 4 parts by mass, still more preferably 0.1 to 3 parts by mass, relative to 100 parts by mass of the fluororesin.

Examples of the inorganic particulate include silica, highly dielectric inorganic particles, and reinforcing filler.

In order to improve the take-up easiness of the film without impairing the mechanical strength of the film, silica is preferred. In order to achieve good take-up easiness and breakdown strength of the film, silica is preferably present in an amount of 0.01 to 1 parts by mass, more preferably 0.1 parts by mass or more, relative to 100 parts by mass of the fluororesin. Too large an amount thereof may cause a large interface with an additive, resulting in defects.

Examples of the highly dielectric inorganic particles include barium titanate-based oxide particles and strontium titanate-based oxide particles. In order to achieve good take-up easiness and breakdown strength of the film, the highly dielectric inorganic particles are preferably present in an amount of 0.1 to 10 parts by mass relative to 100 parts by mass of the fluororesin. Too large an amount thereof may cause a large interface with an additive, resulting in defects.

While the presence of the barium titanate-based oxide particles can improve the permittivity, it may also increase the dielectric loss and may decrease the withstand voltage. Thus, the upper limit of the amount of the barium titanate-based oxide particles is about 10 parts by mass relative to 100 parts by mass of the fluororesin. In addition, in order to improve the take-up easiness and the permittivity, the amount of the barium titanate-based oxide particles is preferably 0.1 parts by mass or more. Too large an amount thereof may cause a large interface with an additive, resulting in defects.

In a preferred embodiment, the fluororesin film of the invention is embossed. Embossing enables production of a fluororesin film having the above ten-point average roughness and arithmetic average roughness and reduction in coefficient of static friction, thereby improving the take-up easiness. Embossing can also reduce formation of creases during film processing, reducing defects and improving the reliability. Embossing is performed such that the resulting fluororesin film satisfies the above ten-point average roughness, arithmetic average roughness, and breakdown strength, and may be common embossing.

Specifically, a surface of the film may be embossed by pressing an embossing roll having an uneven pattern of, for example, stripes, satin finish, squares, waves, trapezoids, rhombuses, texture, silky texture, oblique lines, or dots, to the film at room temperature and normal humidity.

In embossing, too deep a dent may cause a small thickness of the film. This portion may have a low breakdown strength. Thus, the depth of the dent formed by the embossing is preferably within 5% of the thickness of the film.

In a preferred embodiment, the fluororesin film of the invention is surface-coated. Surface coating enables production of a fluororesin film having the above ten-point average roughness and arithmetic average roughness and reduction in coefficient of static friction, thereby improving the take-up easiness. Surface coating can also improve the property of breakdown strength. Surface coating is performed such that the fluororesin film satisfies the above ten-point average roughness, arithmetic average roughness, and breakdown strength, and may be conventional surface coating.

Specifically, a surface of the film may be coated by applying a nanoparticle-dispersed solution to the film surface and drying the solution at the boiling point of the solvent or higher. The nanoparticles preferably have a particle size of 500 nm or smaller, and examples thereof include silica, alumina, zirconia, titanium oxide, and zinc oxide. Any solvent may be used. Still, if the solvent is not uniformly applied to the film surface, it may cause unevenness. Thus, the solvent is preferably an ether- or ketone-based solvent which is less likely to be repelled on the fluororesin film. Mere combination of nanoparticles with a solvent may fail to cause sticking of the surface coating to the film surface. Thus, a binder is also added thereto. A binder may be polyvinylidene fluoride, for example.

In a preferred embodiment, the fluororesin in the fluororesin film of the invention contains two fluororesin species. The presence of two fluororesin species enables production of a fluororesin film having the above ten-point average roughness and arithmetic average roughness and reduction in coefficient of static friction, thereby improving the take-up easiness. The presence of two fluororesin species can also reduce break of the film during processing, thereby leading to a fluororesin film having excellent mechanical strength.

The two fluororesin species are preferably polymers miscible with each other. The presence of polymers miscible with each other enables production of a fluororesin film which is less likely to break and has excellent mechanical strength.

The phrase "miscible with each other" as used herein means that the two fluororesin species can uniformly be mixed with each other in a molten state.

The fluororesin preferably contains a non-crosslinked fluororesin and a crosslinked fluororesin. The presence of a non-crosslinked fluororesin and a crosslinked fluororesin does not correspond to a composite of different materials but to the same fluorine material. This therefore enables production of a film which is less likely to form an interface and thus has less defects.

The crosslinked fluororesin may be produced by irradiating a non-crosslinked fluororesin with an electron beam. In other words, the crosslinked fluororesin may be one irradiated with an electron beam. Crosslinking with an electron beam may preferably be performed at an absorbed dose of 20 to 100 kGy at room temperature. Electron beam irradiation can form a three-dimensional network of the molecular chains, improving the yield point stress and the elastic modulus.

The crosslinked fluororesin may also be produced by adding a cross-linking agent to a fluororesin and thermosetting or ultraviolet-curing the fluororesin. Examples of the cross-linking agent include dialkyl peroxides, triallyl isocyanurate, and peroxy esters.

In order to be miscible with each other and to provide a fluororesin film having excellent mechanical strength, the non-crosslinked fluororesin and the crosslinked fluororesin are preferably fluororesins containing the same polymerized units, more preferably fluororesins each containing a VdF unit, and are each preferably a VdF/TFE copolymer. The non-crosslinked fluororesin and the crosslinked fluororesin preferably have the same composition ratio. The composition ratio may be one described above for the fluororesin.

The term "crosslink" as used herein means the state of the molecular chains linked to form a three-dimensional network.

In order to achieve good breakdown strength and mechanical strength of the fluororesin film, the crosslinked fluororesin is preferably present in an amount of 0.01 to 10% by mass, more preferably 0.03% by mass or more, still more preferably 0.05% by mass or more, particularly preferably 0.1% by mass or more, relative to the sum of the crosslinked fluororesin and the non-crosslinked fluororesin. Too large an amount thereof may cause a large interface with an additive, resulting in defects. Thus, the amount thereof is more preferably 10% by mass or less, still more preferably 8% by mass or less, particularly preferably 5% by mass or less.

In a preferred embodiment, the fluororesin in the fluororesin film of the invention contains two fluororesin species having different melt flow rates.

In order to achieve good breakdown strength and mechanical strength of the fluororesin film, preferably, a first fluororesin species has a melt flow rate of 2.0 to 30.0 g/10 min and a second fluororesin species has a melt flow rate of 0.1 to 1.9 g/10 min. Also preferably, the first fluororesin species has a melt flow rate of 2.0 to 20.0 g/10 min and the second fluororesin species has a melt flow rate of 0.1 to 1.9 g/10 min. More preferably, the first fluororesin species has a melt flow rate of 2.1 to 10.0 g/10 min and the second fluororesin species has a melt flow rate of 0.5 to 1.8 g/10 min.

In order to achieve good breakdown strength and mechanical strength of the fluororesin film, the fluororesin species having a lower melt flow rate than the other fluororesin species is preferably present in an amount of 0.1 to 10% by mass, more preferably 0.5 to 8% by mass, still more preferably 1 to 5% by mass, relative to 100% by mass of the whole fluororesin.

In a preferred embodiment, the fluororesin in the fluororesin film of the invention contains two fluororesin species having different composition ratios of polymerized units.

In order to achieve good breakdown strength and mechanical strength of the fluororesin film, the fluororesin preferably contains a polymerized unit based on VdF and contains two polymers having different proportions of a polymerized unit based on VdF.

In order to achieve good breakdown strength and mechanical strength of the fluororesin film that contains fluororesin species having different proportions of a polymerized unit based on VdF and because a large amount of a polymer having a smaller proportion of a polymerized unit based on VdF may cause a large interface with an additive and result in defects, this polymer is preferably present in an amount of 0.1 to 10% by mass, more preferably-0.5 to 8% by mass, relative to the whole fluororesin.

In order to achieve good breakdown strength and mechanical strength of the fluororesin film, more preferably, a first fluororesin species is a VdF/TFE copolymer having a mole ratio of a vinylidene fluoride (VdF) unit to a tetrafluoroethylene (TFE) unit of 35.0/65.0 to 50.0/50.0 and a second fluororesin species is a VdF/TFE copolymer having a mole ratio of a VdF unit to a TFE unit of not lower than 10.0/90.0 but lower than 35.0/65.0 (the VdF unit represents not lower than 10.0 mol % but lower than 35.0 mol % and the TFE unit represents not more than 90.0 mol % but more than 65.0 mol % relative to 100 mol % in total of the VdF unit and the TFE unit).

Also preferably, the first fluororesin species may be a vinylidene fluoride/tetrafluoroethylene copolymer having a mole ratio of a vinylidene fluoride unit to a tetrafluoroethylene unit of 95.0/5.0 to 39.0/61.0 and the second fluororesin species may be a vinylidene fluoride/tetrafluoroethylene copolymer having a mole ratio of a vinylidene fluoride unit to a tetrafluoroethylene unit of 38.9/61.1 to 5.0/95.0.

Also preferably, the first fluororesin species may be a vinylidene fluoride/tetrafluoroethylene copolymer having a mole ratio of a vinylidene fluoride unit to a tetrafluoroethylene unit of 50.0/50.0 to 39.0/61.0 and the second fluororesin species may be a vinylidene fluoride/tetrafluoroethylene copolymer having a mole ratio of a vinylidene fluoride unit to a tetrafluoroethylene unit of 38.9/61.1 to 10.0/90.0.

The vinylidene fluoride/tetrafluoroethylene copolymers each preferably further contain a copolymerized unit of an ethylenically unsaturated monomer other than tetrafluoroethylene and vinylidene fluoride. The copolymerized unit of an ethylenically unsaturated monomer is preferably present in an amount of 0.1 to 5.0 mol % of all the copolymerized units.

The fluororesin in the fluororesin film of the invention also preferably contains a vinylidene fluoride/tetrafluoroethylene copolymer and polyvinylidene fluoride. The presence of a vinylidene fluoride/tetrafluoroethylene copolymer and polyvinylidene fluoride in combination can further improve the mechanical properties of the fluororesin film.

The polyvinylidene fluoride is preferably present in an amount of 0.1 to 10% by mass, more preferably 0.5% by mass or more, still more preferably 1% by mass or more, while more preferably 8% by mass or less, particularly preferably 6% by mass or less, relative to the sum of the vinylidene fluoride/tetrafluoroethylene copolymer and the polyvinylidene fluoride.

The term "polyvinylidene fluoride" as used herein means a polymer consisting only of a monomer unit based on vinylidene fluoride.

The fluororesin in the fluororesin film of the invention also preferably contains a vinylidene fluoride/tetrafluoroethylene copolymer and a hexafluoropropylene/tetrafluoroethylene copolymer (FEP). The presence of a vinylidene fluoride/tetrafluoroethylene copolymer and a hexafluoropropylene/tetrafluoroethylene copolymer in combination can further improve the mechanical properties of the fluororesin film.

Too large an amount of the hexafluoropropylene/tetrafluoroethylene copolymer may cause a large interface with an additive, resulting in defects. Thus, the amount of the hexafluoropropylene/tetrafluoroethylene copolymer is preferably 0.1 to 10% by mass, more preferably 0.5% by mass or more, still more preferably 1% by mass or more, while more preferably 8% by mass or less, particularly preferably 6% by mass or less, relative to the sum of the vinylidene fluoride/tetrafluoroethylene copolymer and the hexafluoropropylene/tetrafluoroethylene copolymer.

The hexafluoropropylene/tetrafluoroethylene copolymer (FEP) contains a tetrafluoroethylene (TFE) unit and a hexafluoropropylene (HFP) unit.

The FEP preferably has a mass ratio of a TFE unit to a HFP unit (TFE/HFP) of (70 to 99)/(1 to 30) (% by mass). The mass ratio (TFE/HFP) is more preferably (85 to 95)/(5 to 15) (% by mass).

The FEP is also preferably a TFE/HFP/PAVE copolymer further containing a perfluoroalkyl vinyl ether (PAVE) unit in addition to the TFE unit and the HFP unit. The PAVE unit contained in the FEP may be a unit based on at least one selected from the group consisting of those represented by the following formula (5):

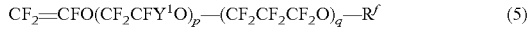

(wherein $Y^1$ is F or $CF_3$; $R^f$ is a C1-C5 perfluoroalkyl group; p is an integer of 0 to 5; and q is an integer of 0 to 5) and those represented by the following formula (6):

(wherein Xs are the same as or different from each other, and are each F or $CF_3$; $R^1$ is a linear or branched C1-C6 perfluoroalkyl group, or a C5-C6 cyclic perfluoroalkyl group).

Specific examples thereof include perfluoro(methyl vinyl ether) (PMVE), perfluoro(ethyl vinyl ether) (PEVE), perfluoro(propyl vinyl ether) (PPVE), and perfluoro(butyl vinyl ether) (PBVE).

The PAVE is preferably one having a bulky side chain, specifically preferably PPVE.

The FEP preferably satisfies that the sum of the polymerized units based on TFE, HFP, and PAVE represents 90 mol % or more, more preferably 95 mol % or more, of all the polymerized units. The FEP may consist only of the polymerized units based on TFE and HFP, or may consist only of the polymerized units based on TFE, HFP, and PAVE.

In an embodiment where the FEP is a TFE/HFP/PAVE copolymer, the FEP preferably has a TFE/HFP/PAVE mass ratio of (70 to 99.8)/(0.1 to 25)/(0.1 to 25) (% by mass). The FEP having the mass ratio within the above range can have much better heat resistance.

The TFE/HFP/PAVE mass ratio is more preferably (75 to 98)/(1.0 to 15)/(1.0 to 10) (% by mass).

The TFE/HFP/PAVE copolymer contains 1% by mass or more of the HFP unit and the PAVE unit in total.

The HFP unit in the TFE/HFP/PAVE copolymer preferably represents 25% by mass or less of all the monomer units. The HFP unit in an amount within the above range can lead to much better heat resistance. The amount of the HFP unit is more preferably 20% by mass or less, still more preferably 18% by mass or less, particularly preferably 15% by mass or less. The amount of the HFP unit is preferably 0.1% by mass or more, more preferably 1% by mass or more, particularly preferably 2% by mass or more.

The amount of the HFP unit can be determined by 19F-NMR.

The PAVE unit in the TFE/HFP/PAVE copolymer is more preferably present in an amount of 20% by mass or less, still more preferably 10% by mass or less, particularly preferably 3% by mass or less. The amount of the PAVE unit is preferably 0.1% by mass or more, more preferably 1% by mass or more. The amount of the PAVE unit can be determined by 19F-NMR.

The FEP may further contain a different ethylenic monomer (α) unit.

The different ethylenic monomer (α) unit may be any monomer unit copolymerizable with the TFE unit and the HFP unit, and further the PAVE unit for a TFE/HFP/PAVE copolymer. Examples thereof include fluorine-containing ethylenic monomers such as vinyl fluoride (VF), VdF, and chlorotrifluoroethylene (CTFE), and non-fluorinated ethylenic monomers such as ethylene, propylene, and alkyl vinyl ethers.

In an embodiment where the copolymer is a copolymer of TFE, HFP, PAVE, and a different ethylenic monomer (α), the copolymer preferably has a TFE/HFP/PAVE/different ethylenic monomer (α) mass ratio of (70 to 98)/(0.1 to 25)/(0.1 to 25)/(0.1 to 25) (% by mass), more preferably (70 to 98)/(0.1 to 25)/(0.1 to 20)/(0.1 to 15) (% by mass), still more preferably (70 to 98)/(0.1 to 20)/(0.1 to 10)/(0.1 to 5) (% by mass).

The TFE/HFP copolymer contains 1% by mass or more in total of the polymerized units other than the TFE unit.

The FEP preferably has a melting point of 200° C. to 300° C., more preferably 210° C. or higher, still more preferably 220° C. or higher, while more preferably 280° C. or lower, particularly preferably 270° C. or lower.

The melting point is the temperature corresponding to the maximum value on a heat-of-fusion curve obtained at a temperature-increasing rate of 10° C./min using a differential scanning calorimeter (DSC).

The FEP preferably has a glass transition temperature (Tg) of 60° C. to 110° C., more preferably 65° C. or higher, while more preferably 100° C. or lower. The glass transition temperature is a value obtained by dynamic viscoelasticity measurement.

The FEP may be produced by any conventionally known method such as a method including mixing monomers to form structural units of the polymer and additives such as a polymerization initiator as appropriate and performing emulsion polymerization, solution polymerization, or suspension polymerization.

The FEP preferably has a melt flow rate (MFR) of 0.1 to 10, more preferably 0.5 or higher, still more preferably 1 or higher, while more preferably 5 or lower, particularly preferably 3 or lower.

The MFR corresponds to the mass (g/10 min) of a polymer that flows out of a nozzle having an inner diameter of 2 mm and a length of 8 mm per 10 minutes at 2970° C. under a load of 5 kg in conformity with ASTM D3307-01.

The fluororesin in the fluororesin film of the invention also preferably contains a vinylidene fluoride/tetrafluoroethylene copolymer and a perfluoroalkyl vinyl ether/tetrafluoroethylene copolymer (PFA). The presence of a vinylidene fluoride/tetrafluoroethylene copolymer and a perfluoroalkyl vinyl ether/tetrafluoroethylene copolymer in combination can increase the surface roughness of the film and reduce the coefficient of friction, improving the handleability of the film.

Too large an amount of the perfluoroalkyl vinyl ether/tetrafluoroethylene copolymer added may cause a large interface with an additive, resulting in defects. Thus, the amount thereof is preferably 0.1 to 10% by mass, more preferably 0.3% by mass or more, still more preferably 0.5% by mass or more, while more preferably 8% by mass or less, particularly preferably 6% by mass or less, relative to the sum of the vinylidene fluoride/tetrafluoroethylene copolymer and the perfluoroalkyl vinyl ether/tetrafluoroethylene copolymer.

The PAVE constituting the PFA may be at least one selected from the group consisting of those represented by the following formula (5):

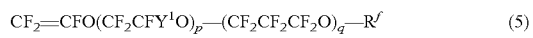

$$CF_2=CFO(CF_2CFY^1O)_p-(CF_2CF_2CF_2O)_q-R^f \quad (5)$$

(wherein $Y^1$ is F or $CF_3$; $R^f$ is a C1-C5 perfluoroalkyl group; p is an integer of 0 to 5; and q is an integer of 0 to 5) and those represented by the following formula (6):

$$CFX=CXOCF_2OR^1 \quad (6)$$

(wherein Xs are the same as or different from each other, and are each F or $CF_3$; $R^1$ is a linear or branched C1-C6 perfluoroalkyl group, or a C5-C6 cyclic perfluoroalkyl group).

Specific examples thereof include perfluoro(methyl vinyl ether) (PMVE), perfluoro(ethyl vinyl ether) (PEVE), perfluoro(propyl vinyl ether) (PPVE), and perfluoro(butyl vinyl ether) (PBVE).

The PAVE is preferably one having a bulky side chain, specifically preferably PPVE.

The PFA preferably contains a polymerized unit based on PAVE in an amount of 1.0 to 10% by mass of all the polymerized units.

The amount of the polymerized unit based on PAVE is more preferably 2.0% by mass or more, still more preferably 3.5% by mass or more, particularly preferably 4.0% by mass or more, most preferably 5.0% by mass or more, while more preferably 8.0% by mass or less, still more preferably 7.0% by mass or less, particularly preferably 6.5% by mass or less, most preferably 6.0% by mass or less, relative to all the polymerized units. The amount of the polymerized unit based on PAVE is determined by $^{19}$F-NMR.

The PFA preferably satisfies that the sum of the polymerized units based on TFE and PAVE represents 90 mol % or more, still more preferably 95 mol % or more, of all the polymerized units. The PFA also preferably consists only of the polymerized units based on TFE and PAVE. The PFA is free from a HFP unit.

The PFA may contain 400 or less unstable end groups per $10^6$ main chain carbon atoms. Examples of the unstable end groups include —COF, —COOH, —CF$_2$H, —COOCH$_3$, —CH$_2$OH, —CONH$_2$, and —CF=CF$_2$. The above number of unstable end groups means the sum of these unstable end groups. The number may be 20 or smaller, and may be 10 or smaller. The lower limit thereof may be 0. In order to achieve a low dissipation factor within a high frequency region (10 GHz or higher), PFA containing 20 or less unstable end groups per $10^6$ main chain carbon atoms is particularly preferred.

The number of unstable end groups can be determined by infrared spectroscopy.

First, the copolymer is melt-extruded and a film having a thickness of 0.25 to 0.3 mm is produced. This film is analyzed by Fourier transform infrared spectroscopy, so that an infrared absorption spectrum of the copolymer is obtained. This spectrum is then compared with a base spectrum of a polymer that is completely fluorinated and thus contains no unstable end group. Thereby, a difference spectrum is obtained. Based on the absorption peak of a specific unstable end group in the difference spectrum, the number N of unstable end groups per $10^6$ carbon sources in the copolymer is calculated by the following formula (A):

$$N=I \times K/t \quad (A)$$

wherein
I: absorbance
K: correction coefficient
t: thickness of film (mm).

The PFA preferably has a melting point of 280° C. to 322° C.

The melting point is more preferably 290° C. or higher, while more preferably 315° C. or lower.

The melting point is the temperature corresponding to the maximum value on a heat-of-fusion curve obtained at a temperature-increasing rate of 10° C./min using a differential scanning calorimeter (DSC).

The PFA preferably has a glass transition temperature (Tg) of 70° C. to 110° C. The glass transition temperature is more preferably 80° C. or higher, while more preferably 100° C. or lower.

The glass transition temperature is a value obtained by dynamic viscoelasticity measurement.

The PFA may be produced by any conventionally known method such as a method including mixing monomers to form structural units of the polymer and additives such as a polymerization initiator as appropriate and performing emulsion polymerization or suspension polymerization.

The fluororesin film of the invention may further contain an additional polymer other than the fluororesin. Preferred examples of the additional polymer include: polycarbonate (PC), polyester, polyethylene terephthalate (PET), polyethylene naphthalate (PEN), silicone resin, polyether, polyvinyl acetate, polyethylene, and polypropylene (PP) for improved flexibility; poly(meth)acrylate, epoxy resin, polyethylene oxide, polypropylene oxide, polyphenylene oxide (PPO), polyphenylene sulfide (PPS), polyamide (PA), polyimide (PI), polyamideimide (PAI), PC, polystyrene, and polybenzimidazole (PBI) for increased strength; and odd polyamide, cyano pullulan, and copper phthalocyanine-based polymers for supplementation of high dielectricity.

The fluororesin and the additional polymer preferably give a mass ratio of 50/50 to 99/1, more preferably 75/25 to 99/1.

The fluororesin film of the invention may contain an affinity improver. Examples of the affinity improver include coupling agents, functional group-modified polyolefin, styrene-modified polyolefin, functional group-modified polystyrene, polyacrylate imide, and cumyl phenol. The affinity improver is added in an amount that does not impair the effects of the invention. In order to achieve a good withstand voltage, the fluororesin film of the invention preferably contains no such a component.

The fluororesin film of the invention preferably has a thickness of 100 μm or smaller, more preferably 50 μm or smaller, still more preferably 30 μm or smaller, particularly preferably 10 μm or smaller. The thickness of the fluororesin film may be 1 μm or greater. The thickness can be measured using a digital thickness meter.

The fluororesin film of the invention preferably has a relative permittivity ($\varepsilon$) of 9 or higher, more preferably 10 or higher, at a frequency of 1 kHz and 30° C.

The relative permittivity is a value calculated by the following formula: $C=\varepsilon \times \varepsilon_0 \times S/d$, wherein C is the capacitance of a sample measured using an LCR meter, the sample being prepared by depositing aluminum with a diameter of 50 mm on a surface of the film and depositing aluminum on the whole opposite surface; S is the electrode area; d is the film thickness; and $\varepsilon_0$ is the permittivity of vacuum.

The fluororesin film of the invention preferably has a volume resistivity of 1E+15 Ω·cm or higher, more preferably 2E+15 Ω·cm or higher, at 30° C.

The volume resistivity is measured as follows. First, aluminum is deposited on one surface of the film in vacuo, and thereby a sample is prepared. Next, this sample is placed in a constant temperature chamber (30° C., 25% RH) and a voltage of 50 V/μm is applied to the sample using a digital super megohmmeter/microammeter, whereby the volume resistivity (Ω·cm) is measured.

The fluororesin film of the invention preferably has a dielectric loss tangent of 7% or lower, more preferably 6% or lower, at a frequency of 1 kHz and 150° C.

The dielectric loss tangent is measured using an LCR meter.

The fluororesin film of the invention preferably has a tensile modulus of 800 MPa or higher, more preferably 900 MPa or higher, in the machine direction (MD) at 25° C.

The tensile modulus can be measured in conformity with ASTM D1708.

The fluororesin film of the invention may have an elastic modulus of 800 MPa or higher in the machine direction (MD) at 25° C. and a thickness of 100 μm or smaller. The elastic modulus is more preferably 900 MPa or higher. The thickness is more preferably 30 μm or smaller, still more preferably 10 μm or smaller, while preferably 1 μm or greater.

The fluororesin film of the invention may be produced by a production method including embossing or surface coating on an untreated film containing a fluororesin. The untreated film is obtainable by melt-extruding a fluororesin to provide a film. The film obtained by melt extrusion may be stretched. The melt extrusion and stretching will be described later.

In an embodiment in which the fluororesin in the fluororesin film of the invention contains two fluororesin species, the fluororesin film may be produced by a production method including mixing two fluororesin species to provide a fluororesin mixture, melt-extruding the fluororesin mixture to provide a film, and stretching the resulting film to provide a stretched film.

The formation of the fluororesin mixture and the formation of the film may be performed separately or simultaneously. For example, mixing and melt extrusion of two fluororesin species may be simultaneously performed using a melt extruder.

The melt extrusion may be performed at 250° C. to 380° C.

The melt extrusion may be performed using a melt extruder, preferably with a cylinder temperature of 250° C. to 350° C. and a die temperature of 300° C. to 3800° C.

Preferably, the production method may also include taking up the film obtained by the extrusion on a roll. The temperature of the roll is preferably 0° C. to 180° C.

The film obtained by the extrusion is stretched to provide a stretched film.

The stretching may be either uniaxial stretching or biaxial stretching.

In the uniaxial stretching, the film is stretched in the machine direction (MD) that is the same direction as the direction of extruding the fluororesin in the extrusion molding.

The uniaxial stretching is preferably performed at a stretch ratio of 2 to 10 times, more preferably 3 times or more.

The uniaxial stretching is preferably performed at a stretching temperature of 0° C. to 180° C., more preferably 30° C. or higher, while more preferably 120° C. or lower.

The biaxial stretching stretches the film in the machine direction (MD) and the transverse direction (TD) perpendicular thereto.

The biaxial stretching is preferably performed at a stretch ratio of 2 to 10 times, more preferably 3 times or more, for each of MD and TD.

The biaxial stretching is preferably performed at a stretching temperature of 0° C. to 200° C., more preferably 30° C. or higher, while more preferably 120° C. or lower.

The biaxial stretching may be either sequential biaxial stretching or simultaneous biaxial stretching.

The biaxial stretching may be tenter biaxial stretching or tubular biaxial stretching, for example. Tenter biaxial stretching is preferred.

The biaxial stretching is preferably performed at a stretching temperature of 0° C. to 200° C., more preferably 30° C. or higher and 120° C. or lower.

The sequential biaxial stretching is a technique in which, usually, the film is stretched in the machine direction (MD) utilizing the rotational differences between rolls, and then the rolled film is stretched in TD with the ends (in TD) held by clips. In some cases, the film may be stretched in MD in the order of MD stretching, TD stretching, and MD stretching.

The simultaneous biaxial stretching is a technique in which the ends (in TD) of a rolled film are held by clips, and the distance between the clips is increased in both MD and TD so that the film is stretched.

The production method may also preferably include thermosetting the stretched film obtained by the stretching. The thermosetting can reduce shrinkage of the film due to factors such as heat, and can improve the durability.

The thermosetting is preferably performed at a temperature of 100° C. to 250° C., more preferably 150° C. or higher and 200° C. or lower. The thermosetting may be performed in a short time, and may be performed for five minutes or shorter in the case of continuous stretching.

In order to provide a fluororesin film having the above ten-point average roughness, arithmetic average roughness, and breakdown strength and to improve the volume resistivity, the fluororesin film of the invention is preferably a biaxially stretched film, more preferably a biaxially stretched film in which the fluororesin contains two fluororesin species.

The fluororesin film of the invention is suitable as a highly dielectric film or a piezoelectric film.

In the case of using the film of the invention as a piezoelectric film, the film is preferably subjected to a polarization treatment. The polarization treatment may be performed by corona discharge, for example, by applying voltage to the film using a linear electrode or a needle electrode as described in JP 2011-181748 A. The polarization treatment may be followed by heat treatment.

The fluororesin film of the invention can also be suitably used in a film capacitor, an electrowetting device, or a piezoelectric panel.

The fluororesin film of the invention has a low coefficient of static friction, and thus has excellent take-up easiness. Further, the fluororesin film of the invention has excellent breakdown strength, and thus can particularly suitably be used as a highly dielectric film of a film capacitor.

A film for a film capacitor including the fluororesin film and an electrode layer on at least one surface thereof is also one aspect of the invention. A film capacitor including the film for a film capacitor is also one aspect of the invention.

Examples of the structure of a film capacitor include: laminated structures in which electrode layers and highly dielectric films are alternately stacked (for example, those disclosed in JP S63-181411 A and JP H03-18113 A); and rolled structures in which tape-shaped highly dielectric films and tape-shaped electrode layers are taken up together (for example, one disclosed in JP S60-262414 A in which electrodes are not continuously stacked on a highly dielectric film, and one disclosed in JP H03-286514 A in which electrodes are continuously stacked on a highly dielectric film). A rolled film capacitor in which electrodes are continuously stacked on a highly dielectric film, which is relatively easily producible and has a simple structure, can generally be produced by taking up together two highly dielectric films each having an electrode stacked on one side thereof such that the electrodes do not contact each other, and then fixing these films as appropriate so as not to be loosened.

The electrode layer may be any layer, and is usually a layer of conductive metal such as aluminum, zinc, gold, platinum, or copper. It is used in the form of metal foil or a deposited metal film. Metal foil or a deposited metal film may be used alone or both may be used in combination. Usually, a deposited metal film is preferred because a thin electrode layer can be obtained with a higher capacity for its volume, excellent adhesion to a dielectric film, and a small variation in thickness. A deposited metal film is not limited to a single layer, but may be a multi-layer, if necessary, which can be obtained by, for example, a method in which a semi-conductive aluminum oxide layer is formed on an aluminum layer so as to give moisture resistance, thereby producing an electrode layer (for example, JP H02-250306 A). The deposited metal film preferably has a thickness of 100 to 2000 angstrom, more preferably 200 to 1000 angstrom, although not limited thereto. The deposited metal film having a thickness within this range is suitable because the capacity and strength of the capacitor are balanced.

A deposited metal film to be used as an electrode layer may be formed by any method, such as vacuum deposition, sputtering, or ion plating. Usually, vacuum deposition is used.

There are several types of vacuum deposition, such as batch type for molded articles, and semi-continuous type and continuous (air to air) type for long-size articles. Currently, semi-continuous vacuum deposition is the mainstream. The semi-continuous metal deposition is a method in which a metal is deposited and coiled in a vacuum system which is then brought back to atmospheric pressure, and the deposited film is taken out.

The semi-continuous metal deposition may be performed specifically by the method described with reference to FIG. 1 in JP 3664342 B.

In the case of forming a thin metal layer on the film, the film surface may be subjected to a pretreatment such as corona treatment or plasma treatment so as to improve the adhesion. Metal foil to be used as an electrode layer usually has a thickness of 0.1 to 100 μm, preferably 1 to 50 μm, more preferably 3 to 15 μm, although not limited thereto.

The fixing may be performed by any method. For example, a resin may be used to seal the structure or an insulation case may be used to encapsulate the structure, so that the structure can be fixed and protected at the same time. Also, a lead wire may be connected by any method, such as welding, ultrasonic pressure welding, thermal pressure welding, or fixing with adhesive tape. The lead wire may be connected to an electrode before taking up. For example, in the case of encapsulation in an insulation case, if necessary, an opening may be sealed with a thermosetting resin such as urethane resin or epoxy resin to prevent oxidative degradation.

The fluororesin film of the invention can be suitably used as a highly dielectric film of an electrowetting device.

The electrowetting device may include a first electrode, a second electrode, a conductive liquid movably contained between the first electrode and the second electrode, and the film (highly dielectric film) of the invention between the first electrode and the conductive liquid so as to insulate the first electrode from the second electrode. The film of the invention may have a water-repellent layer thereon. In addition to the conductive liquid, an insulating liquid may be held between the first electrode and the second electrode, and the conductive liquid and the insulating liquid may together form a bi-layer.

The electrowetting device may be used in optical elements, display devices (displays), varifocal lenses, light modulating devices, optical pickup devices, optical recording/reproducing devices, developing devices, droplet dispensers, and analytical instruments (such as chemical, biochemical, and biological analytical instruments which require movement of a small amount of conductive liquid to analyze samples).

The fluororesin film of the invention can be suitably used as a piezoelectric film of a piezoelectric panel.

The piezoelectric panel may include a first electrode, the fluororesin film (piezoelectric film) of the invention, and a second electrode in the stated order. The first electrode is directly or indirectly disposed on one of the main surfaces of the film. The second electrode is directly or indirectly disposed on the other main surface of the film.

The piezoelectric panel may be used in touch screens. A touch screen can be used in input devices. An input device including the touch screen allows data to be input based on the touch position and/or touch pressure. The input device including the touch screen can include a position sensor and a pressure sensor.

The input device may be used in electronic devices such as mobile phones (e.g., smartphones), personal digital assistants (PDAs), tablet PCs, ATMs, automatic ticket vending machines, and automotive navigation systems. An electronic device including the input device can be handled and operated based on the touch position and/or touch pressure.

In addition, the film of the invention can also be used as a film for environmental power generation such as vibration power generation or for ferroelectric devices such as touch sensors, touch screens, tactile sensors, dielectric bolometers, film speakers, and haptics, and electrostrictive actuators.

EXAMPLES

The invention is described below with reference to examples, but the invention is not limited to these examples.

The parameters in the examples were determined by the following methods.

Monomer Composition of Fluoropolymer

The monomer composition was determined by $^{19}$F-NMR at a measurement temperature set to (melting point of the polymer+20° C.) using a nuclear magnetic resonance device. Elemental analyses were appropriately combined for measurement, depending on the integral value of each peak and the type of each monomer.

Melting Point

The melting point was determined from the peak on an endothermic curve obtained by thermal analysis at a temperature-increasing rate of 10° C./min using a differential scanning calorimeter in conformity with ASTM D-4591.

Film Thickness

The thickness of the film placed on a substrate was measured at room temperature using a digital thickness meter.

Relative Permittivity

Aluminum was deposited on both surfaces of the film in vacuo, and thereby a sample was prepared. The capacitance of the sample was measured at a frequency of 1 kHz and 30° C. using an LCR meter. The relative permittivity was calculated from the measured capacitance.

Volume Resistivity

First, aluminum was deposited on one surface of the film in vacuo, and thereby a sample was prepared. Next, this sample was placed in a constant temperature chamber (30° C., 25% RH) and a voltage of 50 V/µm was applied to the sample using a digital super megohmmeter/microammeter, whereby the volume resistivity (Ω·cm) was measured.

The breakdown strength was a value determined in conformity with JIS C 2110.

The film was placed on a lower electrode and a 500-g weight having a diameter of 25 mm was placed thereon as an upper electrode. A voltage applied between the ends was increased at a rate of 100 V/sec, and the voltage at break was measured. The number of measurement operations was 50. The measured values of the respective operations, excluding the five highest values and the five lowest values, were averaged. This average was divided by the thickness, whereby the breakdown strength was obtained.

The ten-point average roughness and the arithmetic average roughness were determined in conformity with JIS B 0601-2001.

Coefficient of Static Friction

The coefficient of static friction was determined using a surface property tester under the following measurement conditions: a speed of 150 mm/min, a measurement length of 15.0 mm, a roller load of 100 g, with a roller having a width of 60 mm and a diameter of 30 mm. In the measurement, the film is also attached to the roller, and the coefficient of static friction between the two films stacked was measured. If the films failed to slide and the coefficient of static friction was not measured, the result was evaluated as poor.

Crystallinity

The crystallinity of the film was determined by peak separation using an X-ray diffractometer. Specifically, films were stacked to provide a measurement sample having a total thickness of 40 µm or greater. This measurement sample was mounted on a sample holder, and analyzed using the X-ray diffractometer, so that a diffraction spectrum was obtained. The crystallinity was then calculated from the area ratio of the crystal portions and the amorphous portions in the diffraction spectrum.

The components used in the examples and the comparative examples are as follows.

Fluororesin (1): VdF/TFE copolymer, VdF/TFE=40.0/60.0 (mole ratio), MFR: 2.7 g/10 min, melting point: 216° C. (containing 1% by weight or less of a structural unit of an ethylenically unsaturated monomer other than VdF and TFE)

(Additives)

Additive A: crosslinked fluororesin obtained by applying 20 kGy of electron beam to VdF/TFE copolymer (VdF/TFE=40.0/60.0 (mole ratio), containing 1% by weight or less of a structural unit of an ethylenically unsaturated monomer other than VdF and TFE, MFR: 0.8 g/10 min, melting point: 216° C.)

Additive B: PVDF, MFR: 1 g/10 min, melting point: 172° C.

Additive C: VdF polymer 1 which is VdF/TFE copolymer, VdF/TFE=31.0/69.0 (mole ratio), MFR: 1.5 g/10 min, melting point: 240° C. (containing 1% by weight or less of a structural unit of an ethylenically unsaturated monomer other than VdF and TFE)

Additive D: VdF polymer 2 which is VdF/TFE copolymer, VdF/TFE=22.0/78.0 (mole ratio), MFR: 1.6 g/10 min, melting point: 270° C. (containing 1% by weight or less of a structural unit of an ethylenically unsaturated monomer other than VdF and TFE)

Additive E: FEP (hexafluoropropylene/tetrafluoroethylene copolymer), MFR: 1 g/10 min, melting point: 260° C.

Example 1

Additive A in an amount of 1 part by mass was added to 99 parts by mass of resin pellets of Fluororesin (1). The mixture was formed into a film using a melt extruder at 290° C. to 350° C. Thereby, a film having a thickness of 85 μm was obtained. This 85-μm-thick film was stretched 3.5 times at 60° C. using a biaxial stretcher. Thereby, a stretched film having a thickness of 9 μm was obtained.

Example 2

Additive A in an amount of 3 parts by mass was added to 97 parts by mass of resin pellets of Fluororesin (1). The mixture was formed into a film using a melt extruder at 290° C. to 350° C. Thereby, a film having a thickness of 75 μm was obtained. This 75-μm-thick film was stretched 3.5 times at 60° C. using a biaxial stretcher. Thereby, a stretched film having a thickness of 7 μm was obtained.

Example 3

Additive A in an amount of 5 parts by mass was added to 95 parts by mass of resin pellets of Fluororesin (1). The mixture was formed into a film using a melt extruder at 290° C. to 350° C. Thereby, a film having a thickness of 80 μm was obtained. This 80-μm-thick film was stretched 3.5 times at 60° C. using a biaxial stretcher. Thereby, a stretched film having a thickness of 8 μm was obtained.

Example 4

Additive B in an amount of 1 part by mass was added to 99 parts by mass of resin pellets of Fluororesin (1). The mixture was formed into a film using a melt extruder at 290° C. to 350° C. Thereby, a film having a thickness of 85 μm was obtained. This 85-μm-thick film was stretched 3.5 times at 60° C. using a biaxial stretcher. Thereby, a stretched film having a thickness of 10 μm was obtained.

Example 5

Additive B in an amount of 3 parts by mass was added to 97 parts by mass of resin pellets of Fluororesin (1). The mixture was formed into a film using a melt extruder at 290° C. to 350° C. Thereby, a film having a thickness of 80 μm was obtained. This 80-μm-thick film was stretched 3.5 times at 60° C. using a biaxial stretcher. Thereby, a stretched film having a thickness of 9 μm was obtained.

Example 6

Additive B in an amount of 5 parts by mass was added to 95 parts by mass of resin pellets of Fluororesin (1). The mixture was formed into a film using a melt extruder at 290° C. to 350° C. Thereby, a film having a thickness of 85 μm was obtained. This 85-μm-thick film was stretched 3.5 times at 60° C. using a biaxial stretcher. Thereby, a stretched film having a thickness of 10 μm was obtained.

Example 7

Additive C in an amount of 1 part by mass was added to 99 parts by mass of resin pellets of Fluororesin (1). The mixture was formed into a film using a melt extruder at 290° C. to 350° C. Thereby, a film having a thickness of 80 μm was obtained. This 80-μm-thick film was stretched 3.5 times at 60° C. using a biaxial stretcher. Thereby, a stretched film having a thickness of 8 μm was obtained.

Example 8

Additive C in an amount of 3 parts by mass was added to 97 parts by mass of resin pellets of Fluororesin (1). The mixture was formed into a film using a melt extruder at 290° C. to 3500° C. Thereby, a film having a thickness of 80 μm was obtained. This 80-μm-thick film was stretched 3.5 times at 60° C. using a biaxial stretcher. Thereby, a stretched film having a thickness of 8 μm was obtained.

Example 9

Additive C in an amount of 5 parts by mass was added to 95 parts by mass of resin pellets of Fluororesin (1). The mixture was formed into a film using a melt extruder at 290° C. to 350° C. Thereby, a film having a thickness of 85 μm was obtained. This 85-μm-thick film was stretched 3.5 times at 60° C. using a biaxial stretcher. Thereby, a stretched film having a thickness of 9 μm was obtained.

Example 10

Additive D in an amount of 1 part by mass was added to 99 parts by mass of resin pellets of Fluororesin (1). The mixture was formed into a film using a melt extruder at 290° C. to 350° C. Thereby, a film having a thickness of 75 μm was obtained. This 75-μm-thick film was stretched 3.5 times at 60° C. using a biaxial stretcher. Thereby, a stretched film having a thickness of 7 μm was obtained.

Example 11

Additive D in an amount of 3 parts by mass was added to 97 parts by mass of resin pellets of Fluororesin (1). The mixture was formed into a film using a melt extruder at 290° C. to 350° C. Thereby, a film having a thickness of 75 μm was obtained. This 75-μm-thick film was stretched 3.5 times at 60° C. using a biaxial stretcher. Thereby, a stretched film having a thickness of 7 μm was obtained.

Example 12

Additive D in an amount of 5 parts by mass was added to 95 parts by mass of resin pellets of Fluororesin (1). The mixture was formed into a film using a melt extruder at 290° C. to 350° C. Thereby, a film having a thickness of 85 μm was obtained. This 85-μm-thick film was stretched 3.5 times at 60° C. using a biaxial stretcher. Thereby, a stretched film having a thickness of 9 μm was obtained.

Example 13

Additive E in an amount of 1 part by mass was added to 99 parts by mass of resin pellets of Fluororesin (1). The mixture was formed into a film using a melt extruder at 290° C. to 350° C. Thereby, a film having a thickness of 85 μm was obtained. This 85-μm-thick film was stretched 3.5 times at 60° C. using a biaxial stretcher. Thereby, a stretched film having a thickness of 9 μm was obtained.

Example 14

Additive E in an amount of 1.5 parts by mass was added to 99 parts by mass of resin pellets of Fluororesin (1). The mixture was formed into a film using a melt extruder at 290° C. to 350° C. Thereby, a film having a thickness of 85 µm was obtained. This 85-µm-thick film was stretched 3.5 times at 60° C. using a biaxial stretcher. Thereby, a stretched film having a thickness of 9 µm was obtained.

Example 15

Additive E in an amount of 1 part by mass was added to 99 parts by mass of resin pellets of Fluororesin (1). The mixture was formed into a film using a melt extruder at 290° C. to 350° C. Thereby, a film having a thickness of 85 µm was obtained. This 85-µm-thick film was stretched 4.0 times at 60° C. using a biaxial stretcher. Thereby, a stretched film having a thickness of 7 µm was obtained.

Comparative Example 1

Resin pellets of Fluororesin (1) were formed into a film using a melt extruder at 290° C. to 350° C., and then formed into a film using a T-die molding extruder. Thereby, a film having a thickness of 85 µm was obtained. This 30-µm-thick film was stretched 3.0 times at 60° C. using a uniaxial stretcher. Thereby, a stretched film having a thickness of 10 µm was obtained. The film did not slide and thus the coefficient of static friction was not able to be measured.

Comparative Example 2

Additive B in an amount of 0.05 parts by mass was added to 99.95 parts by mass of resin pellets of Fluororesin (1). The mixture was formed into a film using a melt extruder at 290° C. to 350° C. Thereby, a film having a thickness of 29 µm was obtained. This 29-µm-thick film was stretched 3.0 times at 60° C. using a uniaxial stretcher. Thereby, a stretched film having a thickness of 10 µm was obtained. The film did not slide and thus the coefficient of static friction was not able to be measured.

Comparative Example 3

Additive B in an amount of 11 parts by mass was added to 89 parts by mass of resin pellets of Fluororesin (1). The mixture was formed into a film using a melt extruder at 290° C. to 350° C. Thereby, a film having a thickness of 30 µm was obtained. This 30-µm-thick film was stretched 3.0 times at 60° C. using a uniaxial stretcher. Thereby, a stretched film having a thickness of 11 µm was obtained.

The physical properties of the films obtained in the examples and the comparative examples are shown in Tables 1 and 2.

TABLE 1

| | | Examples | | | | | | | |
|---|---|---|---|---|---|---|---|---|---|
| | | 1 | 2 | 3 | 4 | 5 | 6 | 7 | 8 |
| Resin properties | | | | | | | | | |
| (mol %) | VDF | | | | | 40.0 | | | |
| | TFE | | | | | 60.0 | | | |
| Melting point (° C.) | | | | | | 215 | | | |
| Biaxial stretching | | 3.5 | 3.5 | 3.5 | 3.5 | 3.5 | 3.5 | 3.5 | 3.5 |
| Film thickness (µm) | | 9 | 7 | 8 | 10 | 9 | 10 | 8 | 8 |
| Additives | Type | | A | | | B | | C | |
| | Amount wt % | 1 | 3 | 5 | 1 | 3 | 5 | 1 | 3 |
| Film properties | | | | | | | | | |
| Relative permittivity | 1 kHz 30° C. | 11 | 11 | 11 | 12 | 11 | 8 | 12 | 12 |
| Volume resistivity | Ω · cm | 2E+15 | 2E+15 | 1E+15 | 2E+15 | 1E+15 | 1E+15 | 2E+15 | 2E+15 |
| Surface roughness | Ten-point average roughness | 0.171 | 0.428 | 0.674 | 0.225 | 0.537 | 0.852 | 0.586 | 0.622 |
| | Arithmetic average roughness | 0.010 | 0.017 | 0.024 | 0.010 | 0.016 | 0.022 | 0.012 | 0.016 |
| Coefficient of static friction | | 0.4 | 0.3 | 0.3 | 0.4 | 0.3 | 0.3 | 0.4 | 0.3 |
| Breakdown voltage | V/µm | 580 | 570 | 540 | 520 | 500 | 470 | 590 | 580 |
| Crystallinity | | 64 | 63 | 61 | 60 | 60 | 58 | 65 | 64 |

| | | Examples | | | | | | |
|---|---|---|---|---|---|---|---|---|
| | | 9 | 10 | 11 | 12 | 13 | 14 | 15 |
| Resin properties | | | | | | | | |
| (mol %) | VDF | | | | 40.0 | | | |
| | TFE | | | | 60.0 | | | |
| Melting point (° C.) | | | | | 215 | | | |
| Biaxial stretching | | 3.5 | 3.5 | 3.5 | 3.5 | 3.5 | 3.5 | 4.0 |
| Film thickness (µm) | | 9 | 7 | 7 | 9 | 9 | 9 | 7 |
| Additives | Type | C | | | D | | E | |
| | Amount wt % | 5 | 1 | 3 | 5 | 1 | 1.5 | 1 |
| Film properties | | | | | | | | |
| Relative permittivity | 1 kHz 30° C. | 12 | 12 | 12 | 12 | 11 | 11 | 11 |
| Volume resistivity | Ω · cm | 2E+15 | 2E+15 | 2E+15 | 2E+15 | 2E+15 | 2E+15 | 2E+15 |
| Surface roughness | Ten-point average roughness | 0.792 | 0.526 | 0.528 | 0.672 | 0.327 | 0.720 | 0.306 |
| | Arithmetic average roughness | 0.028 | 0.016 | 0.020 | 0.031 | 0.018 | 0.033 | 0.015 |

TABLE 1-continued

| | | | | | | | | |
|---|---|---|---|---|---|---|---|---|
| Coefficient of static friction | | 0.3 | 0.3 | 0.3 | 0.2 | 0.3 | 0.2 | 0.3 |
| Breakdown voltage | V/μm | 560 | 590 | 580 | 550 | 570 | 560 | 600 |
| Crystallinity | | 63 | 63 | 63 | 61 | 62 | 62 | 71 |

TABLE 2

| | | Comparative Examples | | |
|---|---|---|---|---|
| | | 1 | 2 | 3 |
| Resin properties | | | | |
| (mol %) | VDF | | 40.0 | |
| | TFE | | 60.0 | |
| Melting point (° C.) | | | 215 | |
| Uniaxial stretching | | 3.0 | 3.0 | 3.0 |
| Film thickness (μm) | | 10 | 10 | 11 |
| Additive | Type | None | B | B |
| | Amount wt % | — | 0.05 | 11 |
| Film properties | | | | |
| Relative permittivity | 1 kHz 30° C. | 10 | 11 | 7 |
| Volume resistivity | Ω · cm | 1E+15 | 1E+15 | 1E+14 |
| Surface roughness | Ten-point average roughness | 0.091 | 0.093 | 1.412 |
| | Arithmetic average roughness | 0.006 | 0.007 | 0.073 |
| Coefficient of static friction | | Poor | Poor | 0.2 |
| Breakdown voltage | V/μm | 490 | 480 | 330 |
| Cystallinity | | 60 | 58 | 49 |

The invention claimed is:

1. A fluororesin film comprising a fluororesin,
the fluororesin film having on at least one surface thereof a ten-point average roughness of 0.100 to 1.200 μm and an arithmetic average roughness of 0.010 to 0.050 μm, and the fluororesin film having a breakdown strength of 400 V/μm or higher,
wherein the fluororesin contains a non-crosslinked fluororesin and a crosslinked fluororesin,
wherein the crosslinked fluororesin is present in an amount of 0.01% to 10% by mass relative to the sum of the crosslinked fluororesin and the non-crosslinked fluororesin,
wherein the crosslinked fluororesin is produced by irradiating the non-crosslinked fluororesin with an electron beam, or by adding a cross-linking agent to the non-crosslinked fluororesin and thermosetting or ultraviolet-curing the non-crosslinked fluororesin,
wherein the non-crosslinked fluororesin is a vinylidene fluoride/tetrafluoroethylene copolymer having 5 mol % or more and less than 90 mol % in total of vinylidene fluoride unit relative to 100 mol % in total of the vinylidene fluoride unit and the tetrafluoroethylene unit.

2. The fluororesin film according to claim 1,
wherein the fluororesin further contains a copolymerized unit based on an ethylenically unsaturated monomer other than tetrafluoroethylene and vinylidene fluoride.

3. The fluororesin film according to claim 1, further comprising an inorganic particulate.

4. The fluororesin film according to claim 3,
wherein the inorganic particulate is present in an amount of 0.01 to 5 parts by mass relative to 100 parts by mass of the fluororesin.

5. The fluororesin film according to claim 1,
wherein the fluororesin film is embossed.

6. The fluororesin film according to claim 1,
wherein the fluororesin film is surface-coated.

7. The fluororesin film according to claim 1,
wherein the fluororesin film is a biaxially stretched film.

8. The fluororesin film according to claim 1,
wherein the fluororesin film has a thickness of 1 to 100 μm.

9. A film for a film capacitor, the film comprising the fluororesin film according to claim 1, and an electrode layer on at least one surface of the fluororesin film.

10. A film capacitor comprising the film for a film capacitor according to claim 9.

* * * * *